United States Patent
Hosomi

(10) Patent No.: US 9,400,808 B2
(45) Date of Patent: Jul. 26, 2016

(54) COLOR DESCRIPTION ANALYSIS DEVICE, COLOR DESCRIPTION ANALYSIS METHOD, AND COLOR DESCRIPTION ANALYSIS PROGRAM

(75) Inventor: Itaru Hosomi, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 1114 days.

(21) Appl. No.: 13/502,063

(22) PCT Filed: Oct. 12, 2010

(86) PCT No.: PCT/JP2010/006058
§ 371 (c)(1),
(2), (4) Date: Apr. 13, 2012

(87) PCT Pub. No.: WO2011/045920
PCT Pub. Date: Apr. 21, 2011

(65) Prior Publication Data
US 2012/0195499 A1    Aug. 2, 2012

(30) Foreign Application Priority Data
Oct. 16, 2009    (JP) .................................. 2009-239000

(51) Int. Cl.
*G06F 17/30* (2006.01)

(52) U.S. Cl.
CPC .............................. *G06F 17/30265* (2013.01)

(58) Field of Classification Search
None
See application file for complete search history.

(56) References Cited

U.S. PATENT DOCUMENTS

| | | | |
|---|---|---|---|
| 2005/0088690 A1* | 4/2005 | Haneda et al. | 358/1.15 |
| 2007/0195344 A1* | 8/2007 | Mochizuki et al. | 358/1.9 |
| 2007/0216709 A1* | 9/2007 | Kojima et al. | 345/619 |
| 2007/0216773 A1* | 9/2007 | Kojima et al. | 348/207.1 |
| 2007/0288435 A1 | 12/2007 | Miki et al. | |
| 2009/0192990 A1* | 7/2009 | Chin et al. | 707/3 |
| 2009/0252371 A1* | 10/2009 | Rao | 382/100 |

FOREIGN PATENT DOCUMENTS

| | | | |
|---|---|---|---|
| CN | 101529422 A | 9/2009 |
| JP | 05-108728 A | 4/1993 |
| JP | 2007-304738 A | 11/2007 |
| JP | 2009-003581 A | 1/2009 |

OTHER PUBLICATIONS

Mehta, D.—"A Rule-based Approach to Image Retrieval"—2003 IEEE, pp. 1-5.*
Ogle, V.—"Chabot: Retrieval from a Relational Database of Images"—1995 IEEE, pp. 40-48.*

(Continued)

*Primary Examiner* — Bernard Krasnic
(74) *Attorney, Agent, or Firm* — Sughrue Mion, PLLC

(57) ABSTRACT

The present invention provides a color description analysis device which converts a natural language description as a description regarding colors expressed in a natural language into data representing distribution of values in a prescribed color space, comprising color ratio determining means which determines the ratio of each area occupied by each color included in the natural language description in the whole area of an image as the object of the natural language description by use of words and phrases indicating relationship between colors and included in the natural language description.

14 Claims, 6 Drawing Sheets

(56) References Cited

OTHER PUBLICATIONS

Sugiura, Hiroshi, et al., "Image Retrieval by Natural Language," IEICE Technical Report, May 20, 1994, pp. 55-62, vol. 94, No. 51.
Harada, Shoji, et al., "On Constructing Pictoral Feature Space for Image Retrieval," IEICE Technical Report, Oct. 19, 1995, pp. 7-12, vol. 95, No. 322.
Harada, Shouji, et al., "On Constructing Shape Feature Space for Interpreting Subjective Expressions," Transactions of Information Processing Society of Japan, May 1999, pp. 2356-2366, vol. 40, No. 5.
Kobayakawa, Michihiro, et al., "Interactive Image Retrieval Based on Wavelet Transform and Its Application to Japanese Historical Image Data," I Transactions of Information Processing Society of Japan, Mar. 1999, pp. 899-911, vol. 40, No. 3.
Ihara, Shinsuke, et al., "Mobolget: A Retrieval System for Texts and Images in Blogs," Workshop on Interactive Systems and Software (WISS2005), 2005, pp. 69-74.
Communication dated Nov. 20, 2013, issued by the State Intellectual Property Office of the People's Republic of China in corresponding Application No. 201080046661.8.
Communication dated Sep. 24, 2014 from the Japanese Patent Office in counterpart application No. 2011-543938.
Haruo Kimoto, "An Image Retrieval System Using Impressional Words and the Evaluation of the System," Mar. 1999, vol. 40, No. 3, pp. 886-898.

* cited by examiner

FIG. 1
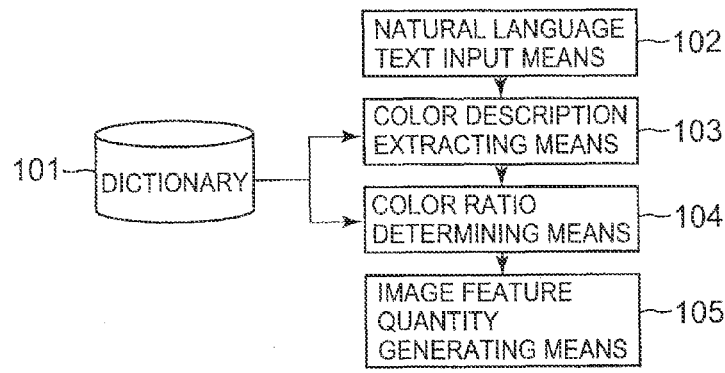
FIG. 2
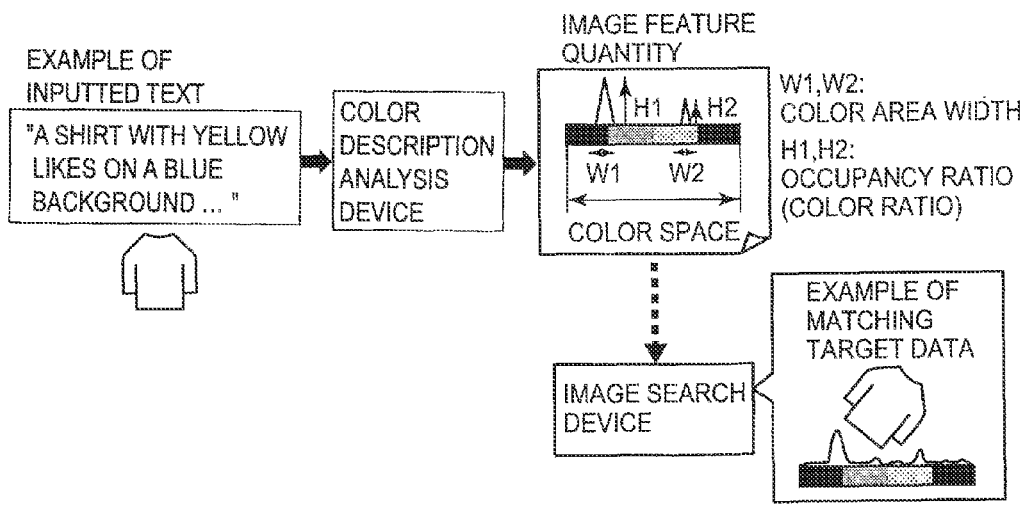
FIG. 3
| TYPE OF DICTIONARY | DESCRIPTION EXAMPLES |
|---|---|
| COLOR NAME DICTIONARY | COLOR NAME: RED,HSVW: 0,1.0,0.5,0.1 |
| | COLOR NAME: BLUE,HSVW: 240,1.0,0.5,0.15 |
| | COLOR NAME: YELLOW,HSVW: 60,1.0,0.5,0.08 |
| | COLOR NAME: WHITE,HSVW: 180,0,1.0,0.1 |
| DEFAULT COLOR | COLOR NAME: WHITE,HSVW: 180,0,1.0,0.1 |
| RELATED TERM DICTIONARY | RELATIONSHIP: AND, DIVIDING RATIO: EQUAL DIVISION |
| | RELATIONSHIP: ON, DIVIDING RATIO: 0.2 : 0.8 |

FIG. 4

(a) "YELLOW ON BLUE" ⇒ [COLOR NAME: YELLOW] [RELATIONSHIP: ON] [COLOR NAME: BLUE]

⇒ [HSVW: 60,1.0,0.5,0.08] [0.2:0.8] [HSVW: 240,1.0,0.5,0.15]

⇒ [HSVW: 60,1.0,0.5,0.08] × [0.2]

[HSVW:240,1.0,0.5,0.15] × [0.8]

(b) "BLUE AND RED ON A WHITE BACKGROUND" ⇒ [ [COLOR NAME:BLUE] [RELATIONSHIP:AND] [COLOR NAME:RED] ] [RELATIONSHIP:ON] [COLOR NAME:WHITE]

⇒ [ [HSVW:240,1.0,0.5,0.15] [EQUAL DIVISION] [HSVW:0,1.0,0.5,0.1] ] [0.2:0.8] [HSVW:180,0,1.0,0.1]

⇒ [ [HSVW:240,1.0,0.5,0.15] × [0.5]

[HSVW:0,1.0,0.5,0.1] × [0.5] ] × [0.2]

[HSVW:180,0,1.0,0.1] × [0.8]

⇒ [HSVW:240,1.0,0.5,0.15] × [0.1]

[HSVW:0,1.0,0.5,0.1] × [0.1]

[HSVW:180,0,1.0,0.1] × [0.8]

FIG. 7

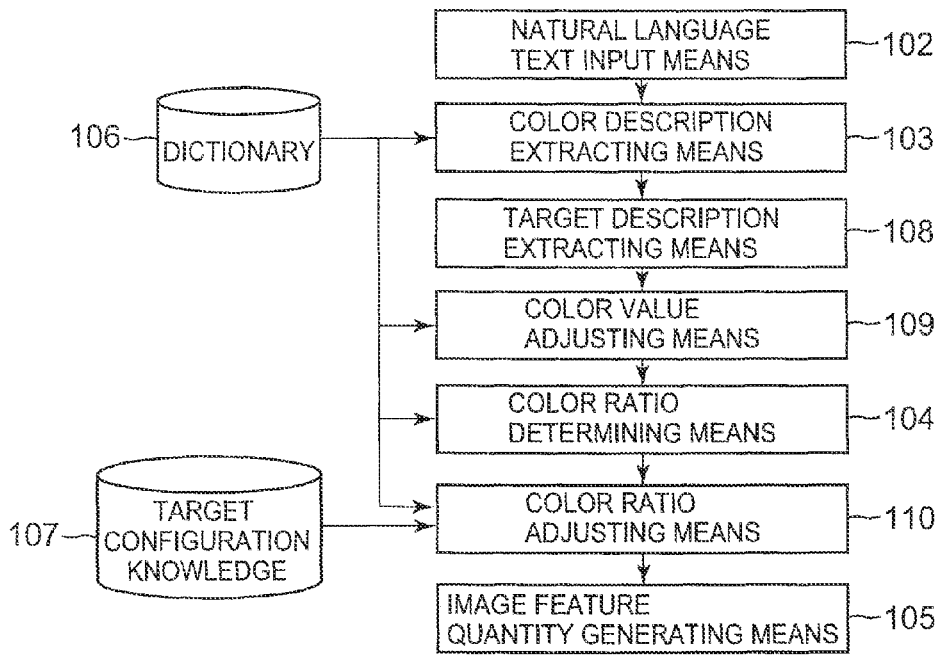

FIG. 8

| TYPE OF DICTIONARY | DESCRIPTION EXAMPLES |
|---|---|
| OBJECT NAME DICTIONARY | CLOTHING NAME: JERSEY, CLOTHING, BLUE |
| | CLOTHING NAME: JACKET, UPPER GARMENT OUTERWEAR, BLUE |
| | CLOTHING NAME: SWEATER, UPPER GARMENT |
| | CLOTHING NAME: SKIRT, LOWER GARMENT |
| COLOR NAME DICTIONARY | COLOR NAME: RED,HSVW: 0,1.0,0.5,0.1 |
| | COLOR NAME: BLUE,HSVW: 240,1.0,0.5,0.15 |
| | COLOR NAME: YELLOW,HSVW: 60,1.0,0.5,0.08 |
| | COLOR NAME: WHITE,HSVW: 180,0,1.0,0.1 |
| DEFAULT COLOR | COLOR NAME: WHITE,HSVW: 180,0,1.0,0.1 |
| RELATED TERM DICTIONARY | RELATIONSHIP: AND, DIVIDING RATIO: EQUAL DIVISION |
| | RELATIONSHIP: ON, DIVIDING RATIO: 0.2 : 0.8 |
| PREMODIFIER DICTIONARY | PRE: BRIGHT,HSVW: 0,-0.1,0.3,0.2 |
| | PRE: THIN, HSVW: 0,-0.2,0.1,0.3 |
| POSTMODIFIER DICTIONARY | POST: -LIKE,HSVW: 0,-0.1,0,0.2 |
| | POST: -TYPE,HSVW: 0,0,0,0.2 |

FIG. 9

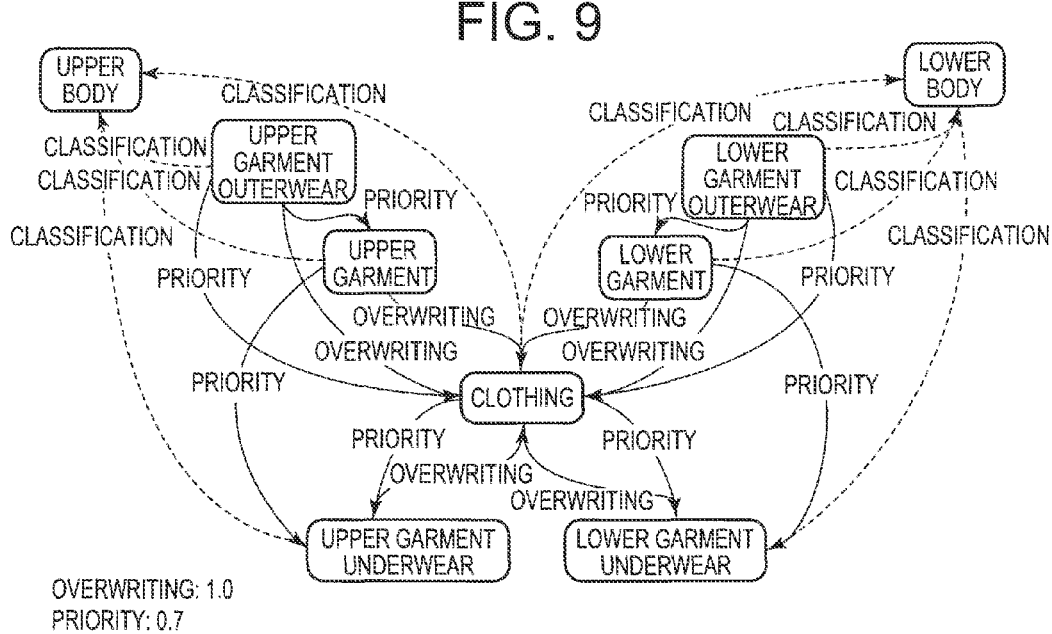

OVERWRITING: 1.0
PRIORITY: 0.7

FIG. 10

"RED-LIKE" ⇒ "RED" (0,1.0,0.5,0.1) + "-LIKE" (0,-0.1,0,0.2) ⇒ (0,0.9,0.5,0.3)

FIG. 11

DICTIONARY: CLOTHING NAME: JACKET, UPPER GARMENT OUTERWEAR

CLOTHING NAME: SWEATER, UPPER GARMENT

KNOWLEDGE: UPPER GARMENT OUTERWEAR---(CLASSIFICATION)--▶ UPPER BODY

UPPER GARMENT---(CLASSIFICATION)--▶ UPPER BODY

UPPER GARMENT OUTERWEAR ---(PRIORITY)--▶ UPPER GARMENT

PRIORITY: 0.7

INPUT: "A BEIGE JACKET AND A RED SWEATER" (STEP 0)

⇒ JACKET (BEIGE (1.0)), SWEATER (RED (1.0)) (STEP 1)

⇒ UPPER GARMENT OUTERWEAR (BEIGE), UPPER GARMENT (RED (1.0)) (STEP 2)

⇒ BEIGE (1.0 × 0.7), RED (1.0 × (1.0 - 0.7)) (STEP 3)

⇒ BEIGE (0.7), RED (0.3) (STEP 4)

COLOR DESCRIPTION ANALYSIS DEVICE, COLOR DESCRIPTION ANALYSIS METHOD, AND COLOR DESCRIPTION ANALYSIS PROGRAM

CROSS REFERENCE TO RELATED APPLICATION

This application is a National Stage of International Application No. PCT/JP2010/006058, filed on Oct. 12, 2010, which claims priority from JP 2009-239000, filed Oct. 16, 2009, the contents of all of which are incorporated herein by reference in their entirety.

TECHNICAL FIELD

The present invention relates to a color description analysis device, a color description analysis method and a color description analysis program for analyzing colors based on descriptions regarding colors in a natural language text.

BACKGROUND ART

Digital still cameras and digital video cameras capable of directly shooting digital still/video images are widespread in recent years and accordingly it has been possible to accumulate a great amount of digital images as data and refer to the accumulated data with ease. For example, websites such as the still image sharing service "Flickr" (http://www.flickr.com) and the video image sharing service "YouTube" (http://www.youtube.com) are providing services that allow users around the world to freely register, search for and refer to still/video images. Further, most online merchandising websites and auction websites are supplying ample photographic images in order to let the users check and compare the articles.

Furthermore, video images shot with surveillance cameras are also being accumulated as digital data. The efficiency of the search for individuals, objects, etc. is being increased by carrying out the search by means of image analysis with a computer.

If, in a search for a digital image, a digital image of an object identical with or similar to the target of the search is at hand, resembling images can be searched for and retrieved at high speed by conducting the image matching between image data using a computer (see Non-patent Literature 1, for example). However, it is sometimes not easy to acquire or generate such a digital image as the sample for the matching. For example, when the real thing to be searched for has not been seen and an image has to be retrieved by using a clue such as a story heard from a person or a description in a document, the image search has to be conducted based on a description that expresses features of the image by use of words.

There is a relevant technique for searching for an image based on a query text (query) described in a natural language. In such a method the search is carried out by matching the query text with each piece of metadata (described with words and phrases in a natural language) previously assigned to each image. There is also a method that conducts the search by converting natural language expressions regarding colors and shapes included in the query text into feature quantities of the image, respectively.

In cases where the former searching method using the metadata is employed, a process basically identical with the ordinary keyword search is carried out. For example, Non-patent Literature 2 discloses a method capable of conducting the image search similarly to the document full-text search by assigning the metadata to each image (automatically extracted from a document (blog)) by using a tool. In such a method that matches the metadata with the query text, it is necessary to previously assign a necessary and sufficient amount of metadata to every image. Thus, the operational cost and the degree of comprehensiveness of the metadata become problematic.

In the latter searching method, there exists a method that conducts the search by converting a natural language expression regarding a shape into a shape feature quantity of the image. For example, Non-patent Literature 3 discloses a method that carries out the search by associating sensuous words such as "angular" and "clear-cut" with shape feature quantities that express the lengths, angles, etc. of parts of an object (e.g. chair) included in the image by use of symbols and numerical values.

The latter searching method also includes a method that conducts the search by converting a natural language expression regarding a color into a color feature quantity of the image. For example, Patent Document 1 discloses a method that searches for a garment, a landscape photograph, etc. by associating a color-related expression such as "blue" or "yellow-like" with a color feature quantity expressed as distribution of values in a color space (RGB, HSI, etc.). Such an image search method using the color feature quantity is usable also for a search for an image to which no metadata has been assigned previously. The image search method using the color feature quantity is effective also for cases where the image search using the shape feature quantities cannot be performed effectively (when items in the same shape (T-shirts, handkerchiefs, etc.) are specially retrieved, when a photographic image of a subject having indefinite shapes (e.g., natural landscape) is retrieved, etc.).

CITATION LIST

Patent Literature

Patent Document 1: JP-2009-3581-A

Non-Patent Literature

Non-patent Literature 1: Kobayakawa et al., "Interactive Image Retrieval Based on Wavelet Transform and Its Application to Japanese Historical Image Data", Transactions of Information Processing Society of Japan, Vol. 40, No. 3, pp. 899-911, 1999

Non-patent Literature 2: Ihara et al., "Mobloget: A Retrieval System for Texts and Images in Blogs", Workshop on Interactive Systems and Software (WISS2005), pp. 69-74, 2005

Non-patent Literature 3: Harada, et al., "On Constructing Shape Feature Space for Interpreting Subjective Expressions", Transactions of Information Processing Society of Japan, Vol. 40, No. 5, pp. 2356-2366, 1999

SUMMARY OF INVENTION

Technical Problem

However, in the methods converting a color-related expression described by a natural language text into a color feature quantity (e.g., the method described in the Patent Document 1), only one color can be designated for one search target image or one object in the image. For example, in cases where the query text is expressed by a combination of two or more colors like "sweater with red and blue patterns" or "shirt with blue lines on a white background", an image search designating the two or more colors cannot be carried out and the target image cannot be searched for and retrieved with high accuracy.

The object of the present invention, which has been made to resolve the above problem, is to provide a color description analysis device, a color description analysis method and a color description analysis program that make it possible to search for and retrieve an intended image with high accuracy even when a color-related description expressed in a natural language describes two or more colors when the image search is conducted based on the color-related description in the natural language.

Solution to Problem

In accordance with an aspect of the present invention, there is provided a color description analysis device which converts a natural language description as a description regarding colors expressed in a natural language into data representing distribution of values in a prescribed color space, comprising color ratio determining means which determines the ratio of each area occupied by each color included in the natural language description in the whole area of an image as the object of the natural language description by use of words and phrases indicating relationship between colors and included in the natural language description.

In accordance with another aspect of the present invention, there is provided a color description analysis device which converts a natural language description as a description regarding colors expressed in a natural language into data representing distribution of values in a prescribed color space, comprising color ratio determining means which determines the ratio of each area occupied by each color in the whole area of an image as the object of the natural language description, in regard to colors specified by the natural language description and a prescribed color memorized previously.

In accordance with another aspect of the present invention, there is provided a color description analysis method wherein data representing distribution of values in a prescribed color space is generated by determining the ratio of each area occupied by each color included in a natural language description, as a description regarding colors expressed in a natural language, in the whole area of an image as the object of the natural language description by use of words and phrases indicating relationship between colors and included in the natural language description.

In accordance with another aspect of the present invention, there is provided a color description analysis method wherein data representing distribution of values in a prescribed color space is generated by determining the ratio of each area occupied by each color in the whole area of an image as the object of a natural language description, as a description regarding colors expressed in a natural language, in regard to colors specified by the natural language description and a prescribed color memorized previously.

In accordance with another aspect of the present invention, there is provided a color description analysis program for causing a computer to execute: a process of determining the ratio of each area occupied by each color included in a natural language description, as a description regarding colors expressed in a natural language, in the whole area of an image as the object of the natural language description by use of words and phrases indicating relationship between colors and included in the natural language description; and a process of generating data representing distribution of values in a prescribed color space.

In accordance with another aspect of the present invention, there is provided a color description analysis program for causing a computer to execute: a process of determining the ratio of each area occupied by each color in the whole area of an image as the object of a natural language description, as a description regarding colors expressed in a natural language, in regard to colors specified by the natural language description and a prescribed color memorized previously; and a process of generating data representing distribution of values in a prescribed color space.

Advantageous Effects of the Invention

According to the present invention, an intended image can be searched for and retrieved with high accuracy even when a color-related description expressed in a natural language describes two or more colors when the image search is conducted based on the color-related description in the natural language.

BRIEF DESCRIPTION OF DRAWINGS

FIG. 1 It depicts a block diagram showing an example of the functional configuration of a color description analysis device in accordance with the present invention.

FIG. 2 It depicts an explanatory drawing showing an example of input/output data inputted to the color description analysis device and an image search using the color description analysis device.

FIG. 3 It depicts an explanatory drawing showing a concrete example of a dictionary.

FIG. 4 It depicts an explanatory drawing showing an example of a process executed by color ratio determining means FIG. 5 It depicts a block diagram showing an example of the hardware configuration of the color description analysis device.

FIG. 7 It depicts a block diagram showing an example of the functional configuration of a color description analysis device in accordance with a second exemplary embodiment.

FIG. 8 It depicts an explanatory drawing showing a concrete example of a dictionary in the second exemplary embodiment.

FIG. 9 It depicts an explanatory drawing showing a concrete example of information indicating each class and information indicating relationships between classes included in object configuration knowledge in the second exemplary embodiment.

FIG. 10 It depicts an explanatory drawing showing an example of execution of a process in which color value adjustment means in the second exemplary embodiment corrects an area (in a color space) of each color contained in the search target image.

FIG. 11 It depicts an explanatory drawing showing an example of a process in which color ratio adjustment means in the second exemplary embodiment adjusts area ratios of color areas.

DESCRIPTION OF EMBODIMENTS

First Exemplary Embodiment

Figure 5:
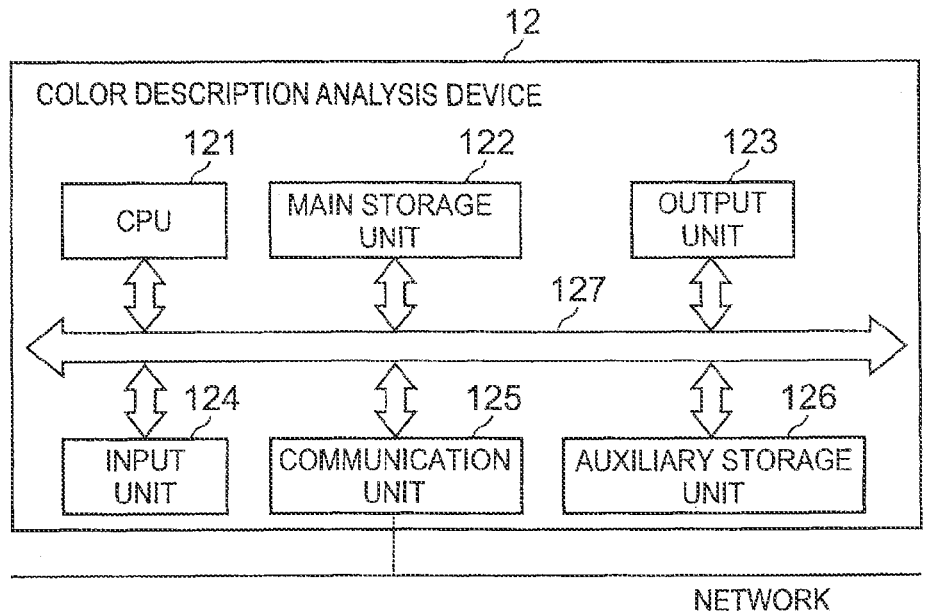

In the following, a first exemplary embodiment of the present invention will be described with reference to figures. FIG. 1 is a block diagram showing an example of the functional configuration of a color description analysis device in accordance with the present invention. As shown in FIG. 1, the color description analysis device in this exemplary embodiment comprises a dictionary 101, natural language text input means 102, color description extracting means 103, color ratio determining means 104 and image feature quantity generating means 105. The color description analysis device is capable of generating image feature quantity data corresponding to an inputted natural language description regarding colors by use of these means. In other words, the color description analysis device in the present invention converts descriptions regarding colors in a natural language text into image feature quantities. Specifically, the color description analysis device is implemented by an information processing device (e.g., personal computer) operating according to a program.

The color description analysis device in accordance with the present invention is applicable for the purpose of conducting image retrieval (image search) from accumulated images shot with cameras, for example. By employing the color description analysis device for such purposes, it becomes possible to conduct an image search based on features of the subject of an image heard from a person (information obtained by inquiry, etc.). The color description analysis device in accordance with the present invention is especially applicable to the purpose of searching for a desired product/equipment (clothing, shoes, etc.), for the purpose of comparing a color distribution generated from a natural language text with a color distribution of the originally intended target of the search and thereby analyzing the difference between a color memorized by a person and the actual color, analyzing the effect of illumination or adjusting illumination, etc.

The dictionary 101 is a dictionary that contains natural language words (words in a natural language) representing colors (hereinafter referred to also as "color descriptions") and natural language words representing relationship between colors (hereinafter referred to also as "related terms"). Specifically, the dictionary 101 is stored in a storage device such as a magnetic disk device or an optical disk device.

The natural language text input means 102 is implemented, specifically, by a CPU of an information processing device operating according to a program and an input device such as a keyboard and a mouse. The natural language text input means 102 has a function of inputting a query text, as a description in the natural language regarding a search target image (an image as the target of the search), according to the user operation.

Incidentally, the natural language text input means 102 is assumed specifically in this exemplary embodiment to input a query text describing features of the search target image regarding colors.

The natural language text input means 102 may also be configured to input or receive a file that contains a query text describing the search target image.

The color description extracting means 103 is implemented, specifically, by a CPU of an information processing device operating according to a program. The color description extracting means 103 has a function of extracting words representing colors (color descriptions) from the query text inputted by the natural language text input means 102 by use of the dictionary 101. The color description extracting means 103 has also a function of extracting the related terms from the query text inputted by the natural language text input means 102 by use of the dictionary 101.

The color ratio determining means 104 is implemented, specifically, by a CPU of an information processing device operating according to a program. The color ratio determining means 104 has a function of determining ratios among the colors included in the query text based on the color descriptions and the related terms extracted by the color description extracting means 103. In this exemplary embodiment, the color ratio determining means 104 extracts values representing a color space corresponding to the color descriptions extracted by the color description extracting means 103 and dividing ratios corresponding to the related terms from the dictionary 101. Based on the extracted values (representing the color space) and dividing ratios, the color ratio determining means 104 determines color areas and color ratios (ratios of areas represented by the colors included in the query text) in the search target image.

The image feature quantity generating means 105 is implemented, specifically, by a CPU of an information processing device operating according to a program. The image feature quantity generating means 105 has a function of generating image feature quantities representing the features of the search target image regarding colors (data representing distribution of values in a prescribed color space) based on the color ratios determined by the color ratio determining means 104. In this exemplary embodiment, the image feature quantity generating means 105 generates image feature quantities in which the color areas and the color ratios determined by the color ratio determining means 104 are included while being associated with each other.

FIG. 2 is an explanatory drawing showing an example of input/output data inputted to the color description analysis device and the image search using the color description analysis device. As shown in FIG. 2, the natural language text input means 102 in this exemplary embodiment inputs a query text such as "A shirt with yellow lines on a blue background . . . " according to the user operation, for example. As shown in the example of FIG. 2, the color description analysis device in this exemplary embodiment is capable of generating image feature quantity data, including information on one or more local areas occupying particular areas in the color space and the occupancy ratio (area ratio of occupancy) of the color in each local area in the whole area of the search target image (color ratio), from a text described in the natural language (hereinafter referred to as a "natural language text"), even for a search target image that is described using a plurality of colors (e.g., "yellow lines on a blue background"). Operations such as the image search for a search target image can be performed by conducting image matching by use of the image feature quantities generated by the color description analysis device.

FIG. 3 is an explanatory drawing showing a concrete example of the dictionary 101. The extraction of the descriptions regarding colors (color descriptions) from the natural language text by the color description extracting means 103 and the determination of the color ratios (occupancy ratios of the areas of the colors described in the natural language text in the color space) by the color ratio determining means 104 can be carried out by referring to the dictionary 101 which has been prepared to contain contents like those shown in FIG. 3.

When the natural language text inputted by the natural language text input means 102 is "yellow lines on a blue background", for example, the color description extracting means 103 is capable of extracting "yellow" and "blue" as color names by referring to the dictionary 101 illustrated in FIG. 3. The color description extracting means 103 is also capable of extracting the related term (word representing a relationship) "on" existing between the color names. As the word representing the relationship (related term), the color description extracting means 103 extracts a pertinent word exclusively from the character string situated between two color names included in the query text. In this example, the color description extracting means 103 extracts the color descriptions and the related terms in order of the extraction from the query text, like [COLOR NAME: YELLOW], [RELATIONSHIP: ON] and [COLOR NAME: BLUE].

Next, the process in which the color ratio determining means 104 determines the area of each color in the color space and the color ratio of each area from the extracted series of words will be explained below. FIG. 4 is an explanatory drawing showing an example of the process executed by the color ratio determining means 104. When the inputted natural language text is "yellow on a blue background" as shown in FIG. 4(*a*), the color description extracting means 103 extracts [COLOR NAME: YELLOW], [RELATIONSHIP: ON] and [COLOR NAME: BLUE] according to a process similar to the above process. Here, by referring again to the dictionary 101 shown in FIG. 3, the color ratio determining means 104 can determine an area (240, 1.0, 0.5, 0.15) of [COLOR NAME: BLUE] which is obtained by adding the color area width W of [COLOR NAME: BLUE] to the values of [COLOR NAME: BLUE] in the color space (HSV space in the dictionary 101 shown in FIG. 3). The color ratio determining means 104 can also determine an area (60, 1.0, 0.5, 0.08) of [COLOR NAME: YELLOW] according to a similar process.

Subsequently, for each of the determined areas of the two colors in the color space, the color ratio determining means 104 determines an inter-color ratio by employing an area dividing ratio (between the color areas) that is represented by the related term [RELATIONSHIP: ON] combining the two colors. In this example, a ratio 0.2:0.8 has been specified by the dictionary 101 shown in FIG. 3 as the dividing ratio corresponding to [RELATIONSHIP: ON]. Thus, the color ratio determining means 104 is capable of judging that the occupancy ratio (area ratio) of the area of [COLOR NAME: YELLOW] in the target image equals 0.2 (20%) and the occupancy ratio (area ratio) of the area of [COLOR NAME: BLUE] in the target image equals 0.8 (80%).

As another example, a case where the inputted natural language text includes a color description "blue and red on a white background" will be explained below. Also in this case, according to a process similar to that shown in FIG. 4(*a*), the color ratio determining means 104 is capable of assigning the area ratios to the colors "blue", "red" and "white" in the ratio of 0.1:0.1:0.8 as shown in FIG. 4(*b*), by which the color ratios of the colors constituting a certain target image can be determined. Incidentally, the color ratio determining means 104 in the example of FIG. 4(*b*) is configured to determine the ratios by prioritizing [RELATIONSHIP: AND] over [RELATIONSHIP: ON] in regard to the combination of color names.

The color ratio determining means 104 may also determine the area ratios of the color areas by further using a value of a default color included in the dictionary 101 illustrated in FIG. 3. For example, the color ratio determining means 104 may be configured to determine the color ratios by using the default color only when the number of color names included in the color-related description extracted from the natural language text is 0 or only one color-related description is included. Alternatively, even when two or more color names are included in the query text, if a related term combining the two or more colors represents equal division (e.g., [RELATIONSHIP: AND]), the color ratio determining means 104 may determine the color ratios by additionally using the default color as one of the colors as the objects of the equal division.

The default color has been designated as white in the example of the dictionary 101 illustrated in FIG. 3. Thus, when only one color [COLOR NAME: RED] is extracted from the natural language text, for example, the color ratio determining means 104 may determine the color ratios by employing the default color as one of the colors as the objects of the equal division. In this case, the color ratio determining means 104 judges that the color descriptions and the related terms included in the query text correspond to [COLOR NAME: WHITE], [RELATIONSHIP: AND] and [COLOR NAME: RED] and determines the color ratios according to the following expression (1):

$$[HSVW:180,0,1.0,0.1]\times[0.5]$$

$$[HSVW:0,1.0,0.5,0.1]\times[0.5] \quad (1)$$

Incidentally, it is assumed that the values representing the color space for each color (values employing HSV in this example) and the values of the dividing ratios for each related term, which are contained in the dictionary 101, have previously been inputted and registered by a system administrator, etc. managing the color description analysis device, for example. The values of the dividing ratios for each related term can be determined as statistics by, for example, totalizing history logs of image searches conducted in the past. It is assumed in this exemplary embodiment that statistics indicating that the inter-color ratio was approximately 50% in cases where the related term "and" was used and the inter-color ratio was 80:20 in cases where the related term "on" was used have been acquired, for example, as the result of the totalization of the history logs of previous image searches, and the dictionary 101 has been set according to the statistics.

While the HSV space is employed as the color space of each color in this exemplary embodiment, the type of the color space is not restricted to that illustrated in this exemplary embodiment; different types of spaces such as the RGB space or the HLS space may also be used as long as the space represents a color space.

According to the process described above, the color area and the color ratio can be determined as shown in FIG. 4 for the color of each object (in one image) identified by a color name described in the dictionary 101. Thus, the image feature quantity generating means 105 shown in FIG. 1 is capable of outputting one or more sets of data (each including a color area and a color ratio) determined by the color ratio determining means 104 as the image feature quantities.

With the configuration and the process described above, the color description analysis device is capable of generating the image feature quantities, including the area in the color space and the occupancy ratio in regard to one or more colors constituting the image, from the inputted natural language text (query text). This makes it possible to search for an image formed of two or more colors based on a natural language text as in the example shown in FIG. 2.

Next, the hardware configuration of the color description analysis device will be described below. FIG. 5 is a block diagram showing an example of the hardware configuration of the color description analysis device. As shown in FIG. 5, the color description analysis device 12 can be implemented by a hardware configuration similar to that of a computer device in general use. The color description analysis device 12 comprises a CPU (Central Processing Unit) 121, a main storage unit 122, an output unit 123, an input unit 124, a communication unit 125 and an auxiliary storage unit 126.

The main storage unit 122 is a main memory implemented by a RAM (Random Access Memory), for example. The main storage unit 122 is used as a work area and a temporary retracting area (temporary saving area) for data. The output unit 123 is implemented by a display device (e.g., liquid crystal display) or a printing device (e.g., printer). The output unit 123 has the function of outputting data. The input unit 124 is implemented by an input device such as a keyboard and a mouse. The input unit 124 has the function of inputting data. In cases where the data input is conducted by loading files, the input unit 124 may also be implemented by a device for reading data from external record media, etc. The communication unit 125 is connected with peripheral devices. The communication unit 125 has the function of transmitting and receiving data. The auxiliary storage unit 126 is implemented by a ROM (Read Only Memory) or a hard disk drive, for example.

The above components 121-126 are connected together by a system bus 127 as shown in FIG. 5.

In the example shown in FIG. 5, the auxiliary storage unit 126 of the color description analysis device 12 stores various programs for analyzing colors contained in the search target image based on the query text inputted as a natural language text. For example, the auxiliary storage unit 126 stores a color description analysis program for causing a computer to execute a process of determining the ratio of each area occupied by each color included in a natural language description (as a description regarding colors expressed in a natural language) in the whole area of the image as the object of the natural language description by using words and phrases indicating relationship between colors and included in the natural language description, and a process of generating data representing distribution of values in a prescribed color space.

The color description analysis device 12 may also be implemented in a hardware-based manner by installing a circuit component, including hardware components such as an LSI (Large Scale Integration) embedded with programs for implementing the functions shown in FIG. 1, in the color description analysis device 12. Alternatively, the color description analysis device 12 may also be implemented in a software-based manner as shown in FIG. 5 by making a computer's CPU 121 execute programs that provide the aforementioned functions of the components shown in FIG. 1. Thus, the CPU 121 is capable of implementing the aforementioned functions in a software-based manner by controlling the operation of the color description analysis device 12 by loading the programs from the auxiliary storage unit 126 into the main storage unit 122 and running the programs.

Figure 6:
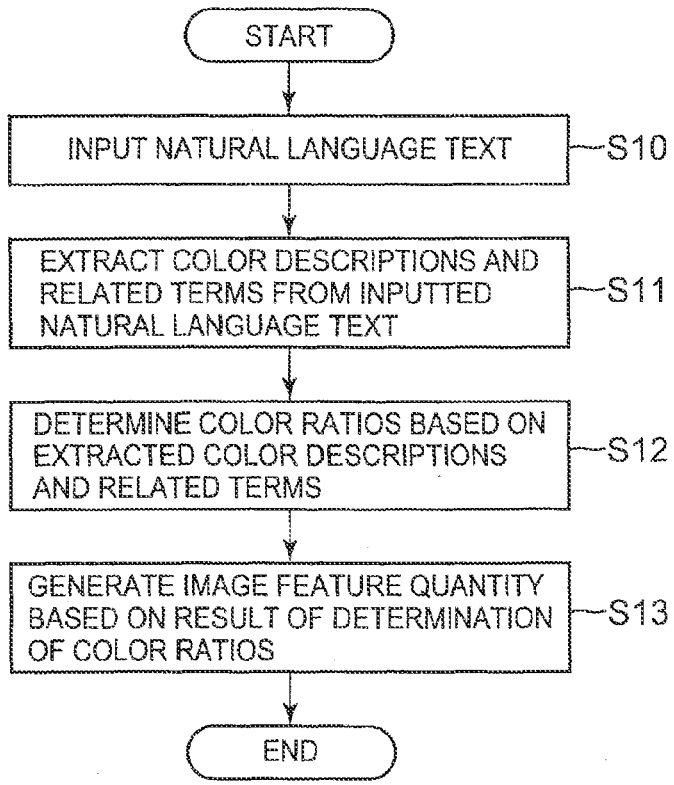
FIG. 6 It depicts a flow chart showing an example of a process in which the color description analysis device inputs a natural language text and analyzes colors contained in a search target image.

Next, the operation will be described. FIG. 6 is a flow chart showing an example of a process in which the color description analysis device inputs a natural language text and analyzes colors contained in the search target image. First, a user who wants to conduct an image search operates the color description analysis device and thereby instructs the device to input a query text that describes features (especially, colors) of the image the user wants to search for (search target image) using a natural language (natural language text). Then, the natural language text input means 102 of the color description analysis device inputs the natural language text according to the user operation (step S10).

Subsequently, the color description extracting means 103 of the color description analysis device extracts the color descriptions and the related terms regarding the search target image from the natural language text inputted by the natural language text input means 102 based on the dictionary 101 (step S11). Subsequently, the color ratio determining means 104 of the color description analysis device determines the ratio between/among the colors included in the query text based on the color descriptions and the related terms extracted by the color description extracting means 103 (step S12). In this exemplary embodiment, the color ratio determining means 104 extracts the values representing the color spaces corresponding to the extracted color descriptions and the dividing ratios corresponding to the related terms from the dictionary 101 and then determines the color areas and the color ratios in the search target image based on the extracted values (representing the color spaces) and dividing ratios.

Subsequently, the image feature quantity generating means 105 of the color description analysis device generates the image feature quantities representing features of the search target image regarding colors based on the color ratios determined by the color ratio determining means 104 (step S13). In this exemplary embodiment, the image feature quantity generating means 105 generates image feature quantities in which the color areas and the color ratios determined by the color ratio determining means 104 are included while being associated with each other.

Thereafter, the image feature quantities generated by the color description analysis device are inputted to an image search device (unshown) which executes the image search. The image search device carries out the image search based on the image feature quantities generated by the color description analysis device, by which an image that matches the search target image is searched for and extracted. Incidentally, the color description analysis device and the image search device may either be implemented using a single (common) information processing device or separate information processing devices.

As described above, according to this exemplary embodiment, the color description analysis device generates data representing the image feature quantities from the natural language text inputted through a keyboard or file loading or received by the communication unit via a network. By using an image search device (unshown) connected to the color description analysis device 12 via a network or by using an image search program executed in the same hardware as the color description analysis device 12, the image search for an image formed of either one color or two or more colors can be realized.

Specifically, the color description analysis device extracts a plurality of color descriptions included in the inputted natural language text while also extracting the related terms. Based on the extracted color descriptions and related terms, the color description analysis device determines the color areas and the color ratios in regard to a plurality of colors. Then, the color description analysis device generates the image feature quantities in which the determined color areas and color ratios are included while being associated with each other. Therefore, even when a color-related description expressed in a natural language describes two or more colors when an image search is conducted based on the color-related description in the natural language, the color-related description can be converted into color feature quantities on the image. Thus, the intended image can be searched for and retrieved with high accuracy even when a color-related description expressed in a natural language describes two or more colors when the image search is conducted based on the color-related description in the natural language. In other words, even when the search target image is made up of two or more colors, the intended image can be searched for and retrieved with high accuracy based on a plain and simple expression in a natural language.

Second Exemplary Embodiment

Next, a second exemplary embodiment of the present invention will be described with reference to figures. FIG. 7 is a block diagram showing an example of the functional configuration of a color description analysis device in accordance with the second exemplary embodiment. As shown in FIG. 7, the color description analysis device in this exemplary embodiment differs from that in the first exemplary embodiment in that the device comprises object configuration knowledge 107, object description extracting means 108, color value adjusting means 109 and color ratio adjusting means 110 in addition to the components shown in FIG. 1. Further, information contained in a dictionary 106 in this exemplary embodiment differs from that contained in the dictionary 101 in the first exemplary embodiment.

The functions of the natural language text input means 102, the color description extracting means 103, the color ratio determining means 104 and the image feature quantity generating means 105 in this exemplary embodiment are equivalent to those described in the first exemplary embodiment, and thus repeated explanation thereof is omitted for brevity.

FIG. 8 is an explanatory drawing showing a concrete example of the dictionary 106 in the second exemplary embodiment. As shown in FIG. 8, the dictionary 106 in this exemplary embodiment differs from the dictionary 101 in the first exemplary embodiment in that the dictionary 106 further contains an object name dictionary, a premodifier dictionary and a postmodifier dictionary in comparison with the dictionary 101 shown in FIG. 3.

The object name dictionary contains names of objects other than colors (e.g., objects such as cloths) selected from words that can be a feature of a search target image. For example, the description "CLOTHING NAME: JERSEY, CLOTHING, BLUE" included in the object name dictionary shown in FIG. 8 indicates that the object represented by the word "CLOTHING NAME: JERSEY" is an instance (example) in a class "CLOTHING". In the example of FIG. 8, the color "BLUE" is the default color for "CLOTHING NAME: JERSEY". This default color for "CLOTHING NAME: JERSEY" can be used in an area recognized as a jersey in the image in the same way as the default color in the dictionary 101 explained in the first exemplary embodiment.

Incidentally, while this exemplary embodiment is explained by taking clothes (jerseys, jackets etc.) as examples of objects that can be included in the search target image, the objects are not restricted to those shown in this exemplary embodiment; the analysis may also be conducted for other objects such as personal effects (bags, cameras, etc.).

As shown in FIG. 8, the premodifier dictionary contains premodifiers ("bright", "thin", etc.) selected from words that can be a feature of a search target image. Meanwhile, the postmodifier dictionary contains postmodifiers ("-like", "-type", etc.) selected from words that can be a feature of a search target image.

The object configuration knowledge 107 includes information indicating each class (a category to which an object that can be included in the search target image can belong) and information indicating relationships between classes. FIG. 9 is an explanatory drawing showing a concrete example of the information indicating each class and the information indicating relationships between classes included in the object configuration knowledge 107 in the second exemplary embodiment. Specifically, the object configuration knowledge 107 is stored in a storage device such as a magnetic disk device or an optical disk device.

In the example of FIG. 9, "CLOTHING", "UPPER GARMENT OUTERWEAR", "UPPER BODY", etc. represent the classes, and "CLASSIFICATION", "OVERWRITING", "PRIORITY", etc. attached to the arrows connecting classes represent specific relationships (each representing the relationships between classes). For the relationships "OVERWRITING" and "PRIORITY" among the relationships between classes, the object configuration knowledge 107 also describes (see FIG. 9) how high percentage the class at the tail of each arrow (representing the relationship between classes) occupies a shared area in the image with respect to the class at the tip of the arrow.

In the object configuration knowledge 107 illustrated in FIG. 9, a setting has been made for the classes "UPPER GARMENT OUTERWEAR" and "UPPER GARMENT" (which share the same area due to being classified under the same class "UPPER BODY") so that the class "UPPER GARMENT OUTERWEAR" has "PRIORITY" over the class "UPPER GARMENT", for example. With this setting, when an object corresponding to "UPPER GARMENT OUTERWEAR" and an object corresponding to "UPPER GARMENT" are described at the same time in the natural language text, it is possible to judge, according to the setting shown in FIG. 9, that the color of the object corresponding to "UPPER GARMENT OUTERWEAR" occupies 0.7 (70%) of the shared area and the color of the object corresponding to "UPPER GARMENT" occupies the remaining 0.3 (30%) of the same shared area. In contrast, when a setting for "OVERWRITING" has been made, it is possible to judge that the color of the object corresponding to the class at the tail of the arrow occupies 1.0 (100%) of the shared area, that is, the whole of the area.

Incidentally, it is assumed that the object name dictionary, the premodifier dictionary and the postmodifier dictionary included in the dictionary 106 have previously been inputted and registered by a system administrator, etc. managing the color description analysis device, for example. The object configuration knowledge 107 is also assumed to have previously been inputted and registered by a system administrator, etc. managing the color description analysis device, for example.

In FIG. 7, the object description extracting means 108 is implemented, specifically, by a CPU of an information processing device operating according to a program. The object description extracting means 108 has a function of referring to the dictionary 106 and thereby extracting object names (described in the object name dictionary in the dictionary 106) from the natural language text inputted by the natural language text input means 102. The object description extracting means 108 also has a function of extracting a class, to which each of the extracted object names belongs, from the object name dictionary. The object description extracting means 108 also has a function of judging the correspondence relationship between the class to which the object name belongs and the color descriptions regarding the object name that have been extracted by the color description extracting means 103 (i.e., color descriptions related to the object name extracted by the object description extracting means 108 among all the color descriptions extracted by the color description extracting means 103). In short, the object description extracting means 108 extracts names of objects from the natural language text and judges the types of the objects by using the dictionary 106.

While the object description extracting means 108 is arranged in the example of FIG. 7 as means for executing a process after the color description extracting means 103, the anteroposterior relationship between the color description extracting means 103 and the object description extracting means 108 is not restricted to that shown in FIG. 7. For example, the object description extracting means 108 may also be arranged before the color description extracting means 103. In this case, the object description extracting means 108 first executes the process of extracting the object names from the natural language text inputted by the natural language text input means 102 and thereafter the color description extracting means 103 executes the process of extracting the color descriptions from the natural language text. The processes by the color description extracting means 103 and the object description extracting means 108 may also be executed concurrently and in parallel.

In FIG. 7, the color value adjusting means 109 is implemented, specifically, by a CPU of an information processing device operating according to a program. The color value adjusting means 109 has a function of referring to the dictionary 106 and thereby extracting color names and modifiers regarding colors from the natural language text inputted by the natural language text input means 102. Specifically, the color value adjusting means 109 extracts premodifiers included in the premodifier dictionary and postmodifiers included in the postmodifier dictionary from the natural language text. The color value adjusting means 109 also has a function of correcting the area of each color in the color space based on the extracted premodifiers and postmodifiers. In short, the color value adjusting means 109 adjusts the position or size of the area occupied in the prescribed color space by each color described with a natural language in the natural language text, by using color-related modifiers contained in the dictionary 106.

FIG. 10 is an explanatory drawing showing an example of the process in which the color value adjusting means 109 in the second exemplary embodiment corrects the area (in the color space) of each color contained in the search target image. For example, when a description "red-like" exists in the inputted natural language text as shown in FIG. 10, the color value adjusting means 109 extracts a set of consecutive elements [COLOR NAME: RED] and [POSTMODIFIER: -LIKE] from the description "red-like". Subsequently, the color value adjusting means 109 corrects the values (0, 1.0, 0.5, 0.1) representing the area for "red" in the color space by using (adding, in this example) the correction values (0, −0.1, 0, 0.2) of "-like" and thereby determines values (0, 0.9, 0.5, 0.3) representing the corrected area. Then, the color value adjusting means 109 employs the corrected values as values of an area representing "red-like".

In this exemplary embodiment, the color ratio determining means 104 determines the color areas and the color ratios in the search target image by using the corrected values acquired by the color value adjusting means 109.

In FIG. 7, the color ratio adjusting means 110 is implemented, specifically, by a CPU of an information processing device operating according to a program. The color ratio adjusting means 110 has a function of referring to the dictionary 106 and the object configuration knowledge 107 and thereby adjusting the area ratio of occupancy of the area of each color in a whole object (occupancy ratio) determined by the color ratio determining means 104. Specifically, in cases where an object area is formed of a combination of two or more partial objects, the color ratio adjusting means 110 changes the area ratio between/among the colors respectively occupying the partial objects based on the composition ratio between/among the partial objects. In short, the color ratio adjusting means 110 determines the area ratio of each color occupying a particular area in the image corresponding to each of the objects by using the relationship between object types included in the object configuration knowledge 107.

FIG. 11 is an explanatory drawing showing an example of the process in which the color ratio adjusting means 110 in the second exemplary embodiment adjusts the area ratios of the color areas. In the example shown in FIG. 11, it is assumed that at least "JACKET" belonging to the class "UPPER GARMENT OUTERWEAR" and "SWEATER" belonging to the class "UPPER GARMENT" have been described as clothing names in the dictionary 106. It is also assumed that the object configuration knowledge 107 (represented simply as "KNOWLEDGE" in FIG. 11) describes at least information indicating a relationship that the class "UPPER GARMENT OUTERWEAR" is "classified" under the class "UPPER BODY", information indicating a relationship that the class "UPPER GARMENT" is "CLASSIFIED" under the class "UPPER BODY", information indicating a relationship that the class "UPPER GARMENT OUTERWEAR" has "PRIORITY" over the class "UPPER GARMENT", and information indicating that the occupancy ratio of the color of an instance in a class having "PRIORITY" equals 0.7 (70%) (PRIORITY: 0.7).

In the example shown in FIG. 11, when the inputted natural language text is "a beige jacket and a red sweater" (step 0), the color ratio adjusting means 110 judges that the ratio of beige among colors occupying the jacket is 100% (color ratio: 1.0) and the ratio of red among colors occupying the sweater is 100% (color ratio: 1.0) based on the contents of the dictionary 106 (step 1).

Subsequently, the color ratio adjusting means 110 judges that the jacket is a type of upper garment outerwear (an instance in the class "UPPER GARMENT OUTERWEAR") and the sweater is a type of upper garment (an instance in the class "UPPER GARMENT") based on the contents of the dictionary 106 (step 2).

Further, the color ratio adjusting means 110 is capable of judging that both the class "UPPER GARMENT OUTERWEAR" and the class "UPPER GARMENT" are classified under the class "UPPER BODY" based on the contents of the object configuration knowledge 107. The color ratio adjusting means 110 is also capable of judging that the class "UPPER GARMENT OUTERWEAR" has "PRIORITY" over the class "UPPER GARMENT" in cases of overlapping (when upper garment outerwear and an upper garment overlap with each other). The color ratio adjusting means 110 is also capable of judging that the color of the instance having "PRIORITY" has an occupancy ratio of "0.7" (70%) among all the instances in the class "UPPER BODY". Therefore, the color ratio adjusting means 110 is capable of determining that the occupancy ratio of "beige" (as the color of the jacket) in the whole "UPPER BODY" equals 1.0×0.7 and the occupancy ratio of "red" (as the color of the sweater) in the whole "UPPER BODY" equals 1.0×(1.0−0.7) (step 3). Consequently, the color ratio adjusting means 110 is capable of determining that the color composition ratio is beige 0.7: red 0.3 (step 4).

In this exemplary embodiment, the image feature quantity generating means 105 generates the image feature quantities based on the color areas after undergoing the area ratio adjustment by the color ratio adjusting means 110.

The color description analysis device illustrated in this exemplary embodiment can be implemented by a hardware configuration similar to that of the color description analysis device in the first exemplary embodiment shown in FIG. 5.

As described above, according to this exemplary embodiment, the color description analysis device extracts object names and classes from the inputted natural language text and thereby corrects the area (in the color space) of each color contained in the search target image. Then, the color description analysis device adjusts the area ratios of the color areas contained in the search target image and generates the image feature quantities based on the color areas after the area ratio adjustment. Therefore, this exemplary embodiment makes it possible to generate the image feature quantities of the image in the color space from the natural language text even when two or more objects in different colors overlap. Thus, it becomes possible to search for and retrieve even an image in which two or more objects in different colors overlap, by use of a natural language text.

Third Exemplary Embodiment

Figure 12:
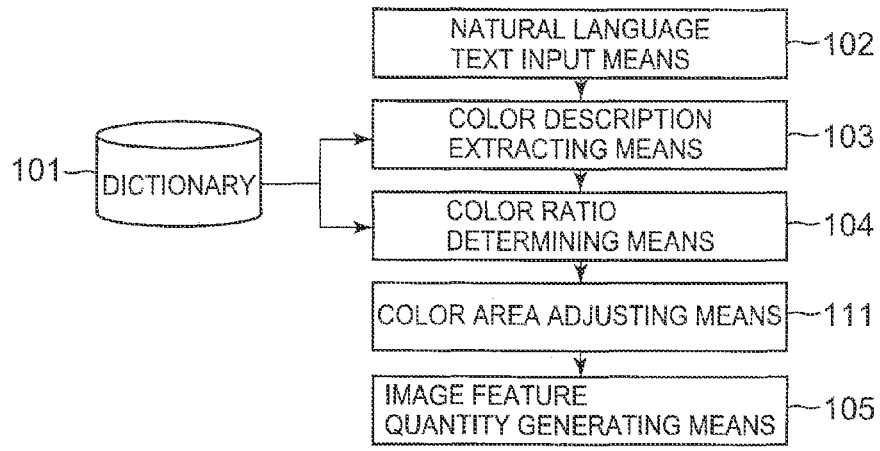
FIG. 12 It depicts a block diagram showing an example of the functional configuration of a color description analysis device in accordance with a third exemplary embodiment.

Next, a third exemplary embodiment of the present invention will be described with reference to figures. FIG. 12 is a block diagram showing an example of the functional configuration of a color description analysis device in accordance with the third exemplary embodiment. As shown in FIG. 12, the color description analysis device in this exemplary embodiment differs from that in the first exemplary embodiment in that the device comprises color area adjusting means 111 in addition to the components shown in FIG. 1.

The information contained in the dictionary 101 in this exemplary embodiment is equivalent to that in the first exemplary embodiment, and thus repeated explanation thereof is omitted for brevity. The functions of the natural language text input means 102, the color description extracting means 103, the color ratio determining means 104 and the image feature quantity generating means 105 in this exemplary embodiment are equivalent to those described in the first exemplary embodiment, and thus repeated explanation thereof is omitted.

As shown in FIG. 12, the color description analysis device in this exemplary embodiment is further equipped with the color area adjusting means 111 in addition to the components described in the first exemplary embodiment. The color area adjusting means 111 is implemented, specifically, by a CPU of an information processing device operating according to a program. The color area adjusting means 111 has a function of adjusting the size of each local area in the color space depending on the distance in the color space between the local areas represented by the extracted color names when a plurality of color names have been extracted from the natural language text by the color description extracting means 103. In other words, the color area adjusting means 111 adjusts the size of each area occupied by each color included in the natural language text depending on the distance in the prescribed color space between the areas occupied by the colors included in the natural language text, for the whole area of the image as the object of the natural language text.

Figure 13:
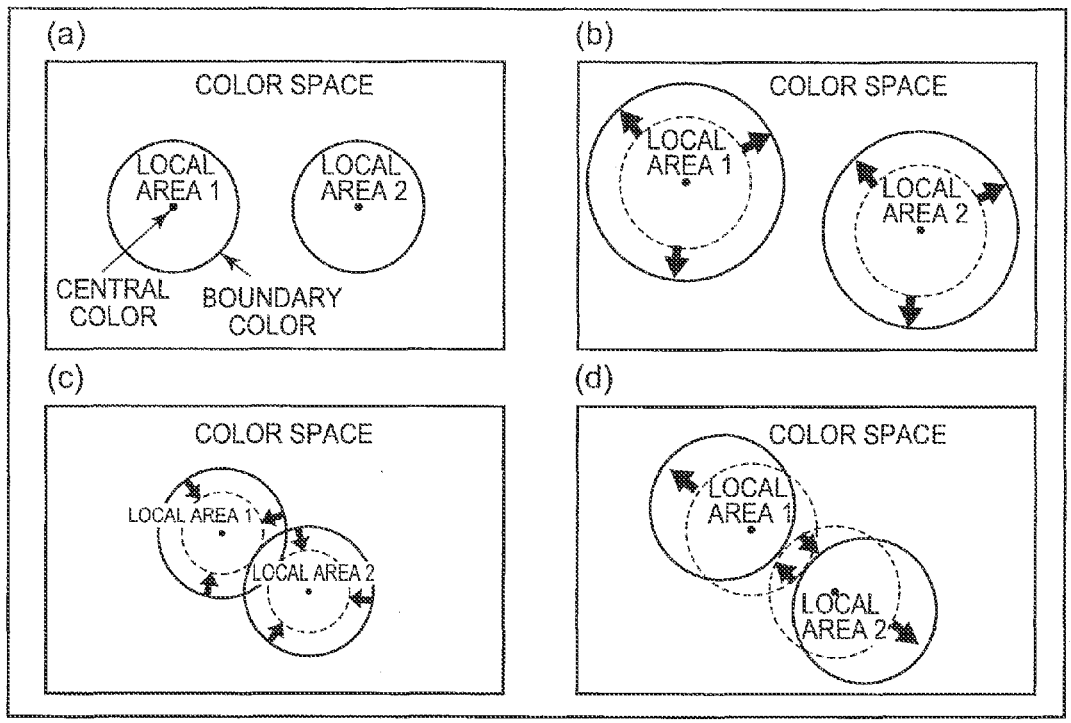
FIG. 13 It depicts an explanatory drawing showing an example of a process in which color area adjustment means in the third exemplary embodiment adjusts the size of each local area in the color space.

FIG. 13 is an explanatory drawing showing an example of the process in which the color area adjusting means 111 in the third exemplary embodiment adjusts the size of each local area in the color space. For example, in cases where local areas 1 and 2 in the color space are in a certain positional relationship in which the distance between the boundary colors of the local areas 1 and 2 equals a particular value (particular distance) as shown in FIG. 13(*a*), the color area adjusting means 111 does not particularly execute a process of changing the distance in the color space from the central color to the boundary color of each local area 1, 2. In cases where the distance between the local areas 1 and 2 is greater than the particular distance as shown in FIG. 13(*b*), the color area adjusting means 111 executes a process of increasing the distance from the central color to the boundary color of each local area 1, 2 until the minimum value of the distance between the boundary colors of the local areas 1 and 2 decreases to a particular value. In contrast, in cases where the distance between the local areas 1 and 2 is less than the particular distance as shown in FIG. 13(*c*), the color area adjusting means 111 executes a process of decreasing the distance from the central color to the boundary color of each local area 1, 2 until the minimum value of the distance between the local areas 1 and 2 increases to a particular value or until the overlap between the local areas 1 and 2 disappears.

In the cases shown in FIGS. 13(*b*) and 13(*c*), it is possible to set a limit value in regard to the ratio of increasing or decreasing the distance from the central color to the boundary color of each local area. The color area adjusting means 111 may also make the adjustment by measuring the distance between the central colors of the local areas 1 and 2 instead of increasing/decreasing the distance between the boundary colors of the local areas. In this case, the color area adjusting means 111 may execute a process of avoiding the overlap by reducing the sizes of parts (regions) of the local areas 1 and 2 facing each other, while maintaining or increasing the occupancy sizes of the local areas 1 and 2 in the color space by enlarging parts (regions) of the local areas 1 and 2 on the other sides as shown in FIG. 13(*d*).

In this exemplary embodiment, the image feature quantity generating means 105 generates the image feature quantities based on the color areas after undergoing the size adjustment by the color area adjusting means 111.

The color description analysis device illustrated in this exemplary embodiment can be implemented by a hardware configuration similar to that of the color description analysis device in the first exemplary embodiment shown in FIG. 5.

As described above, according to this exemplary embodiment, the color description analysis device which has extracted a plurality of color names from the natural language text adjusts the size of each local area in the color space. Then, the color description analysis device generates the image feature quantities based on the color areas after the size adjustment. Therefore, by adjusting the size of each local area depending on the relative distance in the color space between the local areas corresponding to the colors specified with the natural language, the independency of each color specified with the natural language can be maintained while also keeping a wide target range of images matching the generated image feature quantities. This enables an efficient image search in which a natural language text is used as the input, the degree of comprehensiveness is high, and the conditions inputted with the natural language text are well incorporated.

While preferred embodiments of the present invention have been described in the above first through third exemplary embodiments, the color description analysis device in accordance with the present invention is not to be restricted to the above exemplary embodiments. Thus, a variety of modifications understandable to those skilled in the art within the scope of the present invention can be made to the configuration and functions of the color description analysis device in accordance with the present invention.

Figure 14:
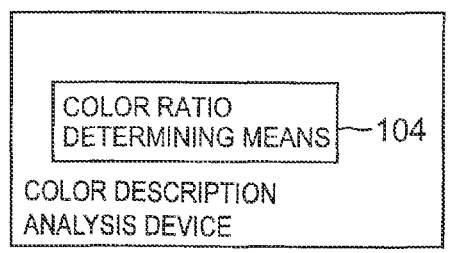
FIG. 14 It depicts a block diagram showing an example of the minimum functional configuration of the color description analysis device.

Next, the minimum configuration of the color description analysis device in accordance with the present invention will be described. FIG. 14 is a block diagram showing an example of the minimum functional configuration of the color description analysis device. As shown in FIG. 14, the color description analysis device comprises the color ratio determining means 104 as its minimum configuration component. The color description analysis device in the minimum configuration shown in FIG. 14 executes a process of converting a natural language description as a description regarding colors expressed in a natural language into data representing distribution of values in a prescribed color space. The color ratio determining means 104 has the function of determining the ratio of each area occupied by each color included in the natural language description in the whole area of an image as the object of the natural language description by use of words and phrases indicating relationship between colors and included in the natural language description.

With the color description analysis device in the minimum configuration shown in FIG. 14, the intended image can be searched for and retrieved with high accuracy even when a color-related description expressed in the natural language describes two or more colors when the image search is conducted based on the color-related description in the natural language.

The following characteristic configurations (1)-(16) of the color description analysis device have been illustrated in the exemplary embodiments described above:

(1) A color description analysis device which converts a natural language description as a description regarding colors expressed in a natural language (e.g., natural language text) into data representing distribution of values in a prescribed color space (e.g., image feature quantities), comprising color ratio determining means (implemented by the color ratio determining means 104, for example) which determines the ratio of each area occupied by each color included in the natural language description in the whole area of an image as the object of the natural language description (e.g., color ratio) by use of words and phrases indicating relationship between colors and included in the natural language description (e.g., related terms).

(2) The color description analysis device may be configured to comprise data generating means (implemented by the image feature quantity generating means 105, for example) which generates the data representing the distribution of values in the prescribed color space based on the result of the determination by the color ratio determining means. The data generating means generates data that includes data representing areas occupied in the prescribed color space by the colors expressed in the natural language in the natural language description (e.g., color areas) and data representing occupancy ratios of the colors expressed in the natural language in the whole area of the image as the object of the natural language description (e.g., color ratios) as the data representing the distribution of values in the color space.

(3) The color description analysis device may be configured to comprise dictionary storage means (e.g., storage device storing the dictionary 101) which stores a dictionary (e.g., dictionary 101) containing at least information regarding color names for identifying descriptions about colors in a natural language text and information regarding words and phrases indicating relationship between colors.

(4) In the color description analysis device, the dictionary storage means may be configured to store a dictionary that contains at least parallel markers (e.g., postpositional particles of Japanese such as "ni" and "to" (particles of English such as "on" and "and")) as the words and phrases indicating relationship between colors.

(5) In the color description analysis device, the dictionary storage means may be configured to store a dictionary that further contains information regarding color-related modifiers (e.g., premodifiers and postmodifiers). The color description analysis device may further comprise color value adjusting means (implemented by the color value adjusting means 109, for example) which adjusts positions or sizes of the areas occupied in the prescribed color space by the colors expressed in the natural language in the natural language description by using the color-related modifiers contained in the dictionary.

(6) A color description analysis device which converts a natural language description as a description regarding colors expressed in a natural language into data representing distribution of values in a prescribed color space, comprising color ratio determining means (implemented by the color ratio determining means 104, for example) which determines the ratio of each area occupied by each color in the whole area of an image as the object of the natural language description, in regard to colors specified by the natural language description and a prescribed color memorized previously (e.g., default color shown in FIG. 3).

(7) In the color description analysis device, the dictionary storage means may be configured to store a dictionary that further contains names of objects to be recognized as parts of the image and information regarding the types of the objects (e.g., information stored in the object name dictionary shown in FIG. 8). The color description analysis device may further comprise: knowledge storage means (e.g., storage device storing the object configuration knowledge 107) which stores object configuration knowledge (e.g., object configuration knowledge 107) including at least information regarding relationship between different object types; object description extracting means (implemented by the object description extracting means 108, for example) which judges the type of each of the objects by extracting the name of the object from the natural language description by using the dictionary stored in the dictionary storage means; and color ratio adjusting means (implemented by the color ratio adjusting means 110, for example) which determines the area ratio of each color occupying a particular area in the image corresponding to each of the objects by using the relationship between object types included in the object configuration knowledge.

(8) The color description analysis device may be configured to further comprise color area adjusting means (implemented by the color area adjusting means 111, for example) which adjusts the size of each area occupied by each color included in the natural language description depending on the distance in the prescribed color space between the areas occupied by the colors included in the natural language description, for the whole area of the image as the object of the natural language description.

(9) A color description analysis device which converts a natural language description as a description regarding colors expressed in a natural language (e.g., natural language text) into data representing distribution of values in a prescribed color space (e.g., image feature quantities), comprising a color ratio determining unit (implemented by the color ratio determining means 104, for example) which determines the ratio of each area occupied by each color included in the natural language description in the whole area of an image as the object of the natural language description (e.g., color ratio) by use of words and phrases indicating relationship between colors and included in the natural language description (e.g., related terms).

(10) The color description analysis device may be configured to comprise a data generating unit (implemented by the image feature quantity generating means 105, for example) which generates the data representing the distribution of values in the prescribed color space based on the result of the determination by the color ratio determining unit. The data generating unit generates data that includes data representing areas occupied in the prescribed color space by the colors expressed in the natural language in the natural language description (e.g., color areas) and data representing occupancy ratios of the colors expressed in the natural language in the whole area of the image as the object of the natural language description (e.g., color ratios) as the data representing the distribution of values in the color space.

(11) The color description analysis device may be configured to comprise a dictionary storage unit (e.g., storage device storing the dictionary 101) which stores a dictionary (e.g., dictionary 101) containing at least information regarding color names for identifying descriptions about colors in a natural language text and information regarding words and phrases indicating relationship between colors.

(12) In the color description analysis device, the dictionary storage unit may be configured to store a dictionary that contains at least parallel markers (e.g., postpositional particles of Japanese such as "ni" and "to" (particles of English such as "on" and "and")) as the words and phrases indicating relationship between colors.

(13) In the color description analysis device, the dictionary storage unit may be configured to store a dictionary that further contains information regarding color-related modifiers (e.g., premodifiers and postmodifiers). The color description analysis device may further comprise a color value adjusting unit (implemented by the color value adjusting means 109, for example) which adjusts positions or sizes of the areas occupied in the prescribed color space by the colors expressed in the natural language in the natural language description by using the color-related modifiers contained in the dictionary.

(14) A color description analysis device which converts a natural language description as a description regarding colors expressed in a natural language into data representing distribution of values in a prescribed color space, comprising a color ratio determining unit (implemented by the color ratio determining means 104, for example) which determines the ratio of each area occupied by each color in the whole area of an image as the object of the natural language description, in regard to colors specified by the natural language description and a prescribed color memorized previously (e.g., default color shown in FIG. 3).

(15) In the color description analysis device, the dictionary storage unit may be configured to store a dictionary that further contains names of objects to be recognized as parts of the image and information regarding the types of the objects (e.g., information stored in the object name dictionary shown in FIG. 8). The color description analysis device may further comprise: a knowledge storage unit (e.g., storage device storing the object configuration knowledge 107) which stores object configuration knowledge (e.g., object configuration knowledge 107) including at least information regarding relationship between different object types; an object description extracting unit (implemented by the object description extracting means 108, for example) which judges the type of each of the objects by extracting the name of the object from the natural language description by using the dictionary stored in the dictionary storage unit; and a color ratio adjusting unit (implemented by the color ratio adjusting means 110, for example) which determines the area ratio of each color occupying a particular area in the image corresponding to each of the objects by using the relationship between object types included in the object configuration knowledge.

(16) The color description analysis device may be configured to further comprise a color area adjusting unit (implemented by the color area adjusting means 111, for example) which adjusts the size of each area occupied by each color included in the natural language description depending on the distance in the prescribed color space between the areas occupied by the colors included in the natural language description, for the whole area of the image as the object of the natural language description.

While the present invention has been described above with reference to the exemplary embodiments, the present invention is not to be restricted to the particular illustrative exemplary embodiments. A variety of modifications understandable to those skilled in the art can be made to the configuration and details of the present invention within the scope of the present invention.

This application claims priority to Japanese Patent Application No. 2009-239000 filed on Oct. 16, 2009, the entire disclosure of which is incorporated herein by reference.

INDUSTRIAL APPLICABILITY

The present invention is applicable to the purpose of conducting image retrieval (image search) from accumulated images shot with cameras. The present invention is especially applicable to the purpose of searching for a desired product/equipment (clothing, shoes, etc.), for the purpose of comparing a color distribution generated from a natural language text with a color distribution of the originally intended target of the search and thereby analyzing the difference between a color memorized by a person and the actual color, analyzing the effect of illumination or adjusting illumination, etc.

REFERENCE SIGNS LIST 101 dictionary
102 natural language text input means
103 color description extracting means
104 color ratio determining means
105 image feature quantity generating means
106 dictionary
107 object configuration knowledge
108 object description extracting means
109 color value adjusting means
110 color ratio adjusting means
111 color area adjusting means
12 color description analysis device
121 CPU
122 main storage unit
123 output unit
124 input unit
125 communication unit
126 auxiliary storage unit
127 system bus

The invention claimed is:

1. A color description analysis device which converts a natural language description as a description regarding colors expressed in a natural language into data representing distribution of values in a prescribed color space, comprising:
a hardware including a processor;
a color description extracting unit, implemented by the processor, which extracts words and phrases indicating relationship between colors and a description regarding colors from the natural language description;

a color ratio determining unit, implemented by the processor, which determines a ratio of each area occupied by each color included in the natural language description in the whole area of an image as an object of the natural language description by use of the words and phrases indicating relationship between colors and included in the natural language description;

a dictionary storage unit which stores a dictionary containing at least information regarding color names for identifying descriptions about colors in a natural language text and information regarding words and phrases indicating relationship between colors, and further contains names of objects to be recognized as parts of the image and information regarding the types of the objects, a knowledge storage unit which stores object configuration knowledge including at least information regarding relationship between different object types;

an object description extracting unit which judges the type of each of the objects by extracting the name of the object from the natural language description by using the dictionary stored in the dictionary storage unit; and a color ratio adjusting unit which adjusts the determined ratio by determining an area ratio of each color occupying a particular area in the image corresponding to each of the objects by using the relationship between object types included in the object configuration knowledge.

2. The color description analysis device according to claim 1, comprising a data generating unit which generates the data representing the distribution of values in the prescribed color space based on the result of the determination by the color ratio determining unit, wherein the data generating unit generates data that includes data representing areas occupied in the prescribed color space by the colors expressed in the natural language in the natural language description and data representing occupancy ratios of the colors expressed in the natural language in the whole area of the image as the object of the natural language description as the data representing the distribution of values in the color space.

3. The color description analysis device according to claim 1, wherein the dictionary storage unit stores a dictionary that contains at least parallel markers as the words and phrases indicating relationship between colors.

4. The color description analysis device according to claim 1, wherein:

the dictionary storage unit stores a dictionary that further contains information regarding color-related modifiers, and the color description analysis device further comprises a color value adjusting unit which adjusts positions or sizes of areas occupied in the prescribed color space by the colors expressed in the natural language in the natural language description by using the color-related modifiers contained in the dictionary.

5. The color description analysis device according to claim 1, further comprising a color area adjusting unit which adjusts the size of each area occupied by each color included in the natural language description depending on a distance in the prescribed color space between the areas occupied by the colors included in the natural language description, for the whole area of the image as the object of the natural language description.

6. A color description analysis method wherein data representing distribution of values in a prescribed color space is generated by determining a ratio of each area occupied by each color included in a natural language description, as a description regarding colors expressed in a natural language, in the whole area of an image as an object of the natural language description by use of words and phrases indicating relationship between colors and included in the natural language description;

storing of a dictionary containing at least information regarding color names for identifying descriptions about colors in a natural language text and information regarding words and phrases indicating relationship between colors, and further contains names of objects to be recognized as parts of the image, information regarding the types of the objects, and information regarding relationship between different object types;

storing object configuration knowledge including at least information regarding relationship between different object types;

judging the type of each of the objects by extracting the name of the object from the natural language description by using the dictionary; and adjusting the determined ratio by determining an area ratio of each color occupying a particular area in the image corresponding to each of the objects by using the relationship between object types included in the object configuration knowledge.

7. The color description analysis method according to claim 6, wherein data that includes data representing areas occupied in the prescribed color space by the colors expressed in the natural language in the natural language description and data representing occupancy ratios of the colors expressed in the natural language in the whole area of the image as the object of the natural language description is generated as the data representing the distribution of values in the color space.

8. The color description analysis method according to claim 6, wherein the dictionary stored contains at least parallel markers as the words and phrases indicating relationship between colors.

9. The color description analysis method according to claim 6, wherein:

the dictionary stored further contains information regarding color-related modifiers, and positions or sizes of areas occupied in the prescribed color space by the colors expressed in the natural language in the natural language description are adjusted by using the color-related modifiers contained in the dictionary.

10. The color description analysis method according to claim 6, wherein the size of each area occupied by each color included in the natural language description is adjusted depending on a distance in the prescribed color space between the areas occupied by the colors included in the natural language description, for the whole area of the image as the object of the natural language description.

11. A non-transitory computer readable information recording medium storing a color description analysis program, when executed by a processor, performs a method for:

generating data representing distribution of values in a prescribed color space by determining a ratio of each area occupied by each color included in a natural language description, as a description regarding colors expressed in a natural language, in the whole area of an image as an object of the natural language description by use of words and phrases indicating relationship between colors and included in the natural language description;

storing of a dictionary containing at least information regarding color names for identifying descriptions about colors in a natural language text and information regarding words and phrases indicating relationship between colors, and further contains names of objects to be recognized as parts of the image, information regarding the types of the objects, and information regarding relationship between different object types;

storing object configuration knowledge including at least information regarding relationship between different object types;

judging the type of each of the objects by extracting the name of the object from the natural language description by using the dictionary; and adjusting the determined ratio by determining an area ratio of each color occupying a particular area in the image corresponding to each of the objects by using the relationship between object types included in the object configuration knowledge.

12. The non-transitory computer readable information recording medium according to claim 11, further comprising:
adjusting positions or sizes of areas occupied in the prescribed color space by the colors expressed in the natural language in the natural language description by using color-related modifiers included in the natural language description.

13. The non-transitory computer readable information recording medium according to claim 11, further comprising:
extracting names of objects to be recognized as parts of the image from the natural language description and thereby judging the type of each of the objects.

14. The non-transitory computer readable information recording medium according to claim 11, further performs a process of adjusting the size of each area occupied by each color included in the natural language description depending on a distance in the prescribed color space between the areas occupied by the colors included in the natural language description, for the whole area of the image as the object of the natural language description.

* * * * *